Feb. 3, 1942. J. Q. GAUBERT ET AL Re. 22,017
ACOUSTIC DEVICE
Original Filed Jan. 5, 1931
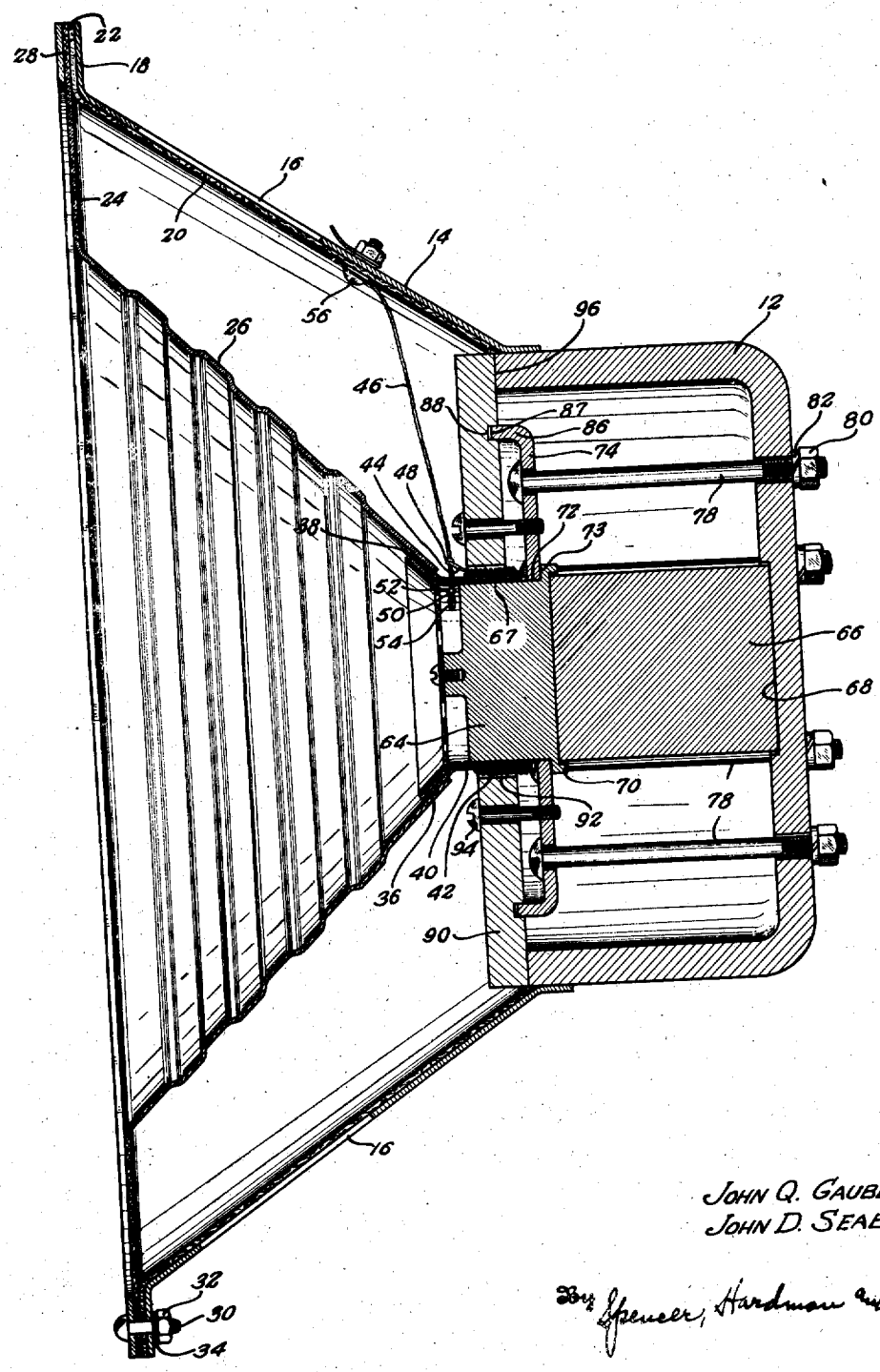
Inventor
JOHN Q. GAUBERT
JOHN D. SEABERT
By Spencer, Hardman and Fehr
Attorneys Reissued Feb. 3, 1942 Re. 22,017

UNITED STATES PATENT OFFICE 22,017

ACOUSTIC DEVICE

John Q. Gaubert, Yonkers, N. Y., and John D. Seabert, Collingswood, N. J., assignors, by mesne assignments, to Radio Corporation of America, New York, N. Y., a corporation of Delaware Original No. 1,991,738, dated February 19, 1935, Serial No. 506,676, January 5, 1931. Application for reissue September 11, 1936, Serial No. 100,316

18 Claims. (Cl. 179—120)

This invention relates to an acoustic device and more particularly to a dynamic speaker having a permanent field magnet.

In the use of loud speakers provided with a movable speech coil in connection with battery operated receivers, it is not practical to provide an electro-magnetic field for the movable speech coil. It has been proposed to use a cast cobalt steel magnetic field. As is well known to those skilled in the art, a permanent magnet that is to be used in connection with a movable speech coil must be made to very accurate dimensions. The allowable tolerance in the air gap is oftentimes only of the order of a thousandth of an inch. This being the case, it is necessary to finish the cast piece by suitable tooling. This is not practical if the permanent magnet is made from such material as cobalt steel having great magnetic retentivity, for the reason that cobalt steel is too hard to be successfully tooled, especially in mass production.

An object of this invention is to provide a permanent cobalt magnet that does not extend near the air gap. This has been accomplished by providing a short magnetic piece of cobalt steel that may be permanently magnetized and that forms part of a magnetic circuit, the balance of which includes suitable ferro-magnetic material that may be easily tooled.

Another object of this invention is to reduce the cost, save material, reduce the labor required in the making of a magnet without sacrificing the efficiency of the magnet.

Further objects and advantages of the present invention will be apparent from the following description, reference being had to the accompanying drawing wherein a preferred embodiment of one form of the present invention is clearly shown.

The drawing represents a cross section through a dynamic acoustic device which is provided with a permanent field magnet.

Referring to the drawing, a cup shaped field housing 12 of ferro-magnetic material such as cold rolled steel or the like is supported by a frame or a radio chassis (not shown) in any suitable manner.

A housing 14 having the apertures 16 of any suitable shape, number and arrangement, has a flared rim 18 that supports the flared edge 22 of a sound damping felt cone 20 and the flared portion 24 of a sound reproducing cone or diaphragm 26 held in position by a clamping ring 28. A plurality of screws 30 extend through plain holes in members 28, 24, 22 and 18 so as to cooperate with the nuts 32 and the lock washers 34, thus securing the members 28, 24 and 22 to the supporting rim 18 of the housing 14.

The small end 36 of the frustro-conical diaphragm 26 is cemented or otherwise secured to the outer surface of a flared rim 38 of a speech coil support 40 which carries a movable speech coil 42. The two terminals 44, only one of which is shown, are wound around a pair of conductors 46, and conductively secured thereto in any suitable manner as at 48. One end 50 of each conductor 46 projects through a hole 52 inside of the speech coil support 40 and is cemented or otherwise secured thereto as at 54. The other end of each conductor 46 is conductively fastened to one of a pair of terminals 56 that are connected to an external circuit (not shown).

In the conventional electro-dynamic speaker, the center pole piece is usually made from a piece of ferro-magnetic material that has one end riveted, welded or otherwise secured to a magnetic housing and the other end machined so as to accurately fit within a movable speech coil. This structure is very satisfactory where the magnetic field is produced by a magnetic coil properly energized.

In the present modification a permanent magnet has been used which is made from tempered cobalt steel. Cobalt steel that has been tempered is very hard to mill or machine. This being the case, if it shall be machined, it is necessary to machine cobalt steel before it is tempered. If this is done, it is practically impossible to temper the cobalt steel after assembling.

In the modification disclosed in the drawing, the center pole piece comprises two pieces, one a tempered cobalt steel cylindrical stud piece 66 and the other a cylindrical cap 64 of ferro-magnetic material. The stud piece 66 is seated in the recess 68 in the magnetic housing 12 and held therein by means of a plurality of screws 78 passing through a center brass annulus 74 provided with an aperture 72 that snugly fits around the machined portion 67 of the other pole piece or cap 64 and that engages a shoulder 73 integral with an annular flange 70. The cap 64 fits around the center pole piece 66.

An annular pole piece 90 provided with a recess 88 is held in position by a flange 87 integral with 86 that extends into the recess 88 and is held in relatively fixed position by the screws 94 that pass through suitable holes in the annular pole piece 90 and threadedly engage the brass annulus 74. It can be readily seen that as the screws 94 and the nuts 80 are tightened, the annular pole piece 90 is clamped against the housing 12 as at 96 and centered with respect to the center pole piece cap 64 by the brass annulus 74 and that the cap 64 cooperates with the housing 12 to clamp the center pole piece 66 into position. The center pole piece 66 having great magnetic virtue or retentivity upon being properly magnetized cooperates with the magnetic housing 12, the annular pole piece 90, the air gap 92, and the center pole piece cap 64 to form a magnetic path.

By this arrangement, the air gap 92 formed between the annular pole piece 90 and the cap 64 is always uniform so that the movable speech coil 42 and its support 40 can move axially without interference with the pole pieces.

While the form of embodiment of the present invention as herein disclosed, constitutes a preferred form, it is to be understood that other forms might be adopted, all coming within the scope of the claims which follow.

What is claimed is as follows:

1. A permanent field magnet in a dynamic acoustic device, comprising in combination, a field housing, a permanently magnetized center pole piece, an annular pole piece, a non-magnetic member for locating the annular pole piece with respect to the center pole piece, fastening means for securing the center pole piece in position, and means for securing the annular pole piece to the field housing through said locating member.

2. A permanent field magnet in a dynamic acoustic device, comprising in combination, a field housing, a permanently magnetized center pole piece, a non-magnetic spacing and clamping member cooperating with the field housing to clamp the center pole in position, an annular pole piece, and means for attaching the annular pole piece to said spacing and clamping member whereby the annular pole piece is secured in a relatively fixed position with respect to the center pole.

3. A permanent field magnet in a dynamic acoustic device comprising in combination, a field housing; a permanently magnetized center pole; an annular pole piece, interposed means for locating the center pole with respect to the annular pole piece; means for securing the locating means to the field housing thereby securing the center pole in position, and means for securing the annular pole piece to said interposed locating means.

4. A permanent field magnet in a dynamic acoustic device, comprising in combination; a a field housing; an annular pole piece; a permanently magnetized center pole piece, a ferro-magnetic center pole piece cap, a non-ferro-magnetic member for locating the center pole piece cap within an aperture of the annular pole piece; fastening means for securing the center pole in position; and adjustable fastening means for securing the annular pole piece to said non-ferro-magnetic member and to the field housing.

5. A permanent field magnet in a dynamic acoustic device, comprising in combination; a field housing; a permanently magnetized center pole piece, an annular pole piece; a locating and clamping non-ferro-magnetic member for securing the center pole to the field housing; a plurality of pressure supplying fasteners for the locating and clamping member; said locating and clamping member holding the center pole within an aperture of the annular pole piece, and a plurality of adjustable fasteners for securing the annular pole piece to said combined locating and clamping member and to the field housing, whereby the annular pole piece and the center pole piece are held in a relatively fixed relation with respect to said field housing.

6. As an article of manufacture, a permanent field magnet comprising a cup-shaped field housing of ferro-magnetic material; an annular pole piece, a permanently magnetized center pole; a center pole piece cap of ferro-magnetic material; a centering member engaging said cap and said annular pole piece, and means for clamping the centering member to the field housing so that the annular pole piece, the center pole piece and the magnetic housing are held in a relatively fixed relation.

7. As an article of manufacture, a permanent field magnet, comprising, a field housing; a center pole cap having a shoulder; a clamping disc engaging said shoulder; and a plurality of adjustable fasteners cooperating with the field housing to clamp the disc against said shoulder whereby the center pole piece and the field housing are held in a relatively fixed relation.

8. As an article of manufacture, a permanent field magnet, comprising a field housing provided with a recess, a permanently magnetized pole piece, said pole piece being received by said recess; a center pole cap of magnetic material, provided with a recess for receiving the other end of the pole piece, a clamping member, said cap having a shoulder for cooperating with said clamping member, and a plurality of adjustable fasteners that supply the clamping pressure.

9. As an article of manufacture, a permanent field magnet, comprising a field housing; a permanently magnetized cylindrical center pole; an annular pole piece surrounding the center pole, said annular pole piece having a groove; a centering member having a central annular aperture that fits around the cylindrical center pole, said centering member having an annular flange engaging the groove in said annular pole piece whereby the air gap is maintained fixed.

10. As an article of manufacture, a permanent field magnet, comprising a field housing, a permanently magnetized center pole having a finished cylindrical portion, an annular pole piece having an annular groove, said groove being concentric with respect to said cylindrical portion; a centering disc which has a central annular aperture that fits around the finished cylindrical portion of the center pole, said centering disc having a depending rim engaging said groove; and adjustable fastening means for securing the annular pole piece to the centering disc.

11. As an article of manufacture, a permanent field magnet, comprising a field housing; a permanently magnetized center pole having a cylindrical portion; an annular pole piece having an annular groove; a disc member having a depending central annular rim that projects into said annular groove, and a plurality of screws for securing the annular pole piece to the disc member.

12. A permanent field magnet comprising, in combination, a field housing; a center pole piece; an annular pole piece, said annular pole piece having a groove, one of said pole pieces having great magnetic retentivity whereby it may be permanently magnetized, a cap for said center pole piece, said cap having a shoulder; a centering disc having a cylindrical recess engaging the shoulder, a projection on said disc engaging said groove and fasteners engaging said annular pole piece and said housing, said fasteners holding the annular pole piece, the disc and the center pole piece cap in a fixed relation.

13. A permanent field magnet, comprising in combination, a field housing, a center pole piece, an annular pole piece having a groove, one of said pole pieces having great magnetic retentivity whereby it may be permanently magnetized, a cap for said center pole piece, said cap having a shoulder, a centering disc having a cylindrical recess engaging the shoulder, a projection on said disc engaging said groove, and means securing the annular pole piece to the field housing thereby securing said centering disc in position.

14. A permanent field magnet, comprising in combination, a field housing of ferromagnetic material, a permanently magnetized center pole piece, an annular pole piece having an annular groove, a cap of ferromagnetic material for said center pole piece, a centering disc of non-ferromagnetic material fitting over the periphery of said cap, said disc also having a depending annular rim projecting into the annular groove of said annular pole piece, and means securing the annular pole piece to the field housing thereby securing said centering disc in position.

15. A permanent field magnet, comprising in combination, a field housing of ferromagnetic material, a permanently magnetized center pole piece, an annular pole piece having an annular groove, a cap of ferromagnetic material for said center pole piece, said cap having a flanged portion, a centering disc of non-ferromagnetic material fitting over the periphery of said cap and resting against the flanged portion thereof, said centering disc also having a depending annular rim adapted to project into the annular groove of the annular pole piece, and means securing the annular pole piece to the field housing thereby maintaining said centering disc interposed between the flanged portion of the cap and the annular groove of the annular pole piece.

16. A permanent field magnet, comprising in combination, a field housing of ferromagnetic material, said housing having a recess, a cap of ferromagnetic material having a recess similar to that of the field housing and a flanged portion, a permanently magnetized center pole piece interposed between said field housing and said cap and located within the recesses thereof, a centering disc of non-ferromagnetic material fitting over the periphery of said cap and resting against the flanged portion thereof, said centering disc also having a depending annular rim adapted to project into the annular groove of the annular pole piece, and means securing the annular piece to the field housing thereby maintaining said centering disc interposed between the flanged portion of the cap and the annular groove of the annular pole piece and also maintaining said center pole piece located within the recesses of the field housing and the cap.

17. A magnet system for dynamic acoustic apparatus comprising a central pole piece, an outer pole piece, a spacing member having an opening therein within which said central pole piece fits, an upturned portion on said spacing member, a recess in said outer pole piece in which said up-turned portion is movable inwardly and outwardly in adjusting the spacing between the spacing member and the outer pole piece, and screw means extending between said outer pole piece and said spacing member for drawing said spacing member toward said outer pole piece the desired amount.

18. A magnet system for dynamic acoustic apparatus comprising a back plate, a central pole piece, a member forming an outer pole piece, a shoulder on said central pole piece, a member fitted around said pole piece and engaging said shoulder for exerting a pressure against said shoulder in the direction to force said central pole piece towards said back plate, and means extending between said back plate and one of said members for drawing said member towards said back plate, whereby said central pole piece is held against said back plate.

JOHN Q. GAUBERT.
JOHN D. SEABERT.